Figure 2:
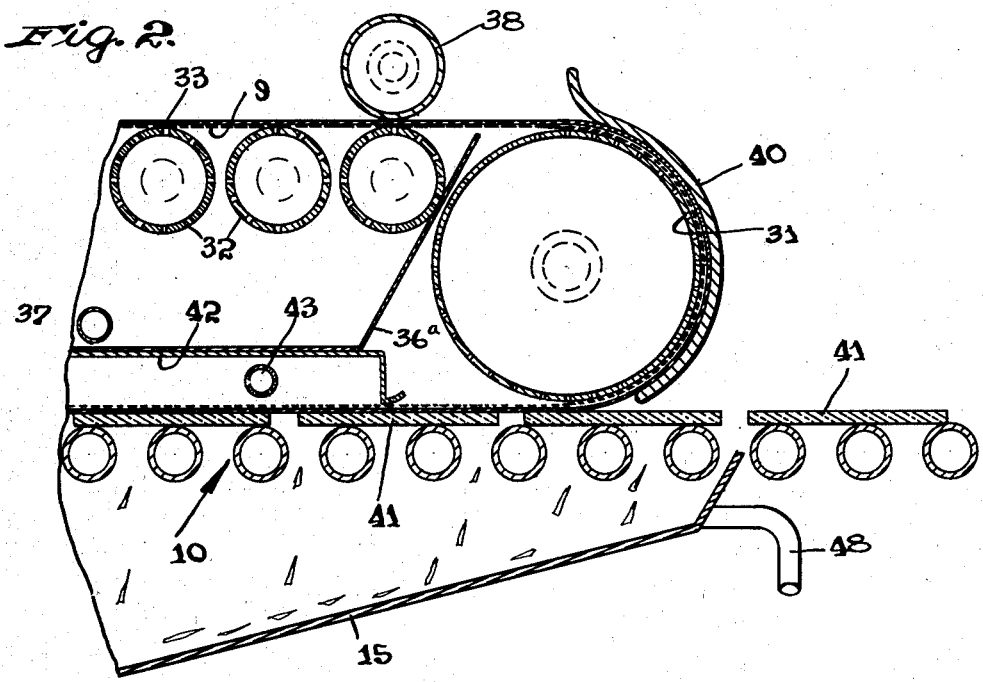

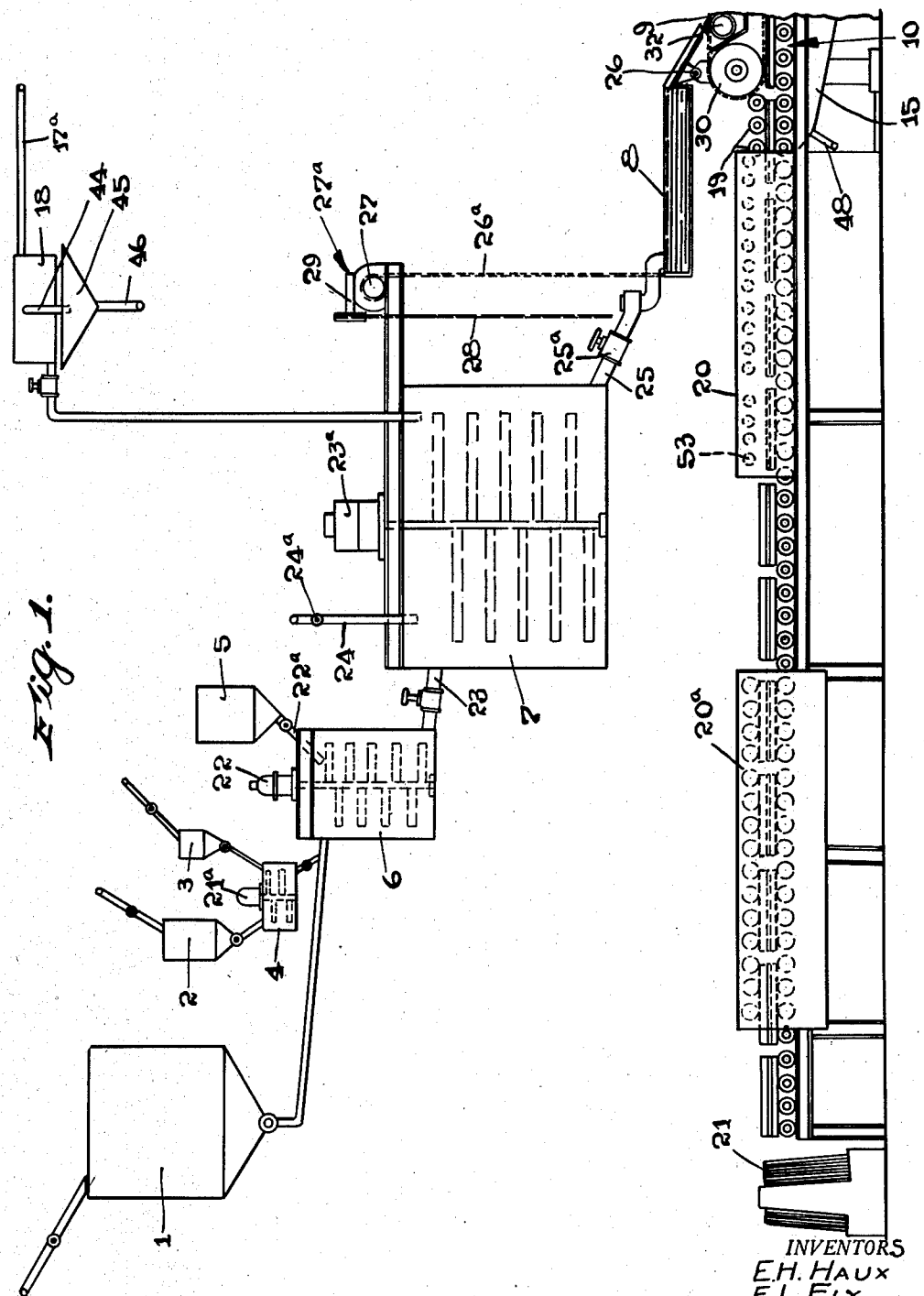

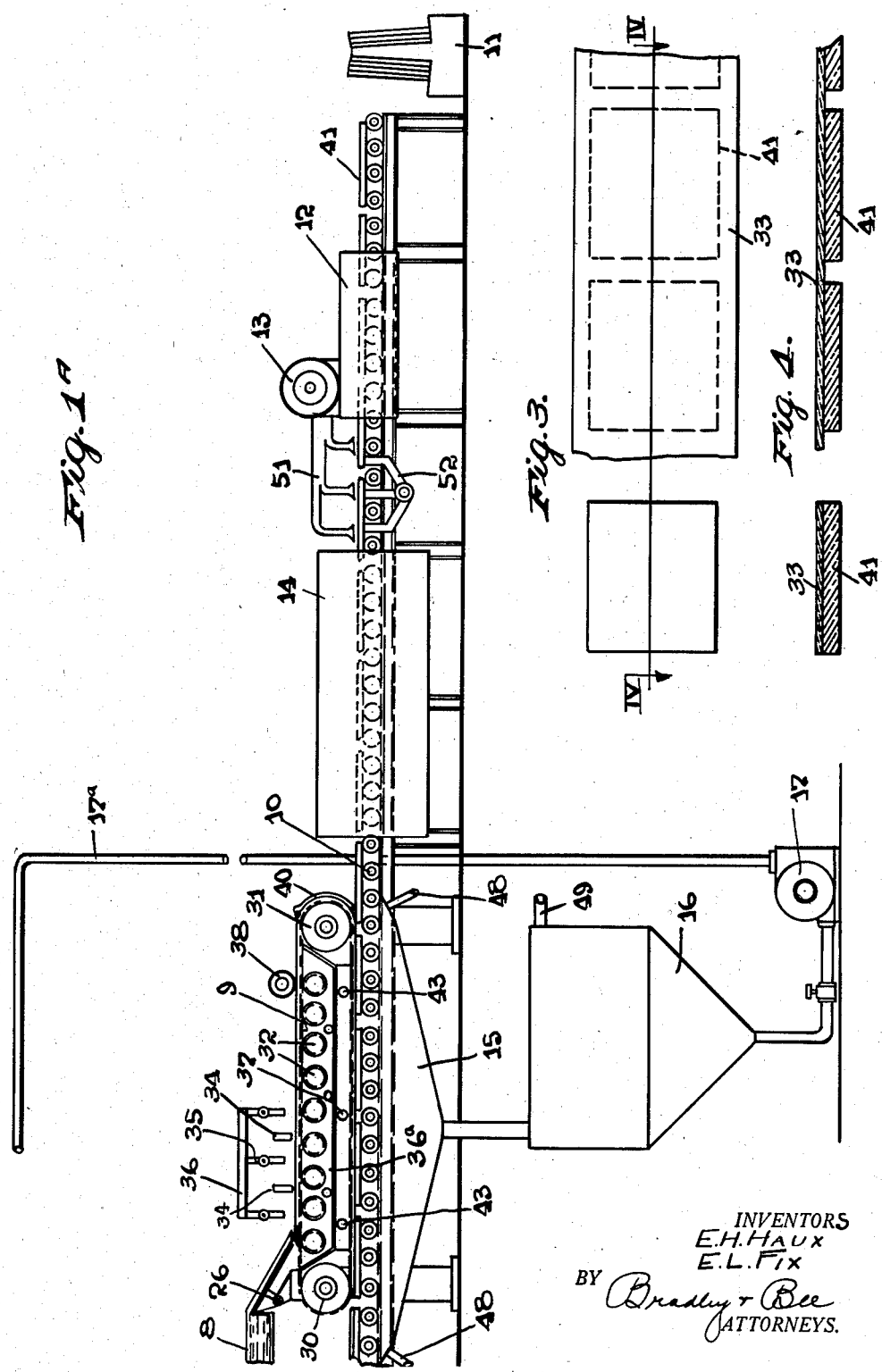

May 23, 1939.  E. H. HAUX ET AL  2,159,630

PROCESS AND APPARATUS FOR MAKING SAFETY GLASS

Filed March 17, 1936  3 Sheets-Sheet 3

INVENTORS
E. H. HAUX
E. L. FIX
BY Bradley + Bell
ATTORNEYS.

Patented May 23, 1939

2,159,630

UNITED STATES PATENT OFFICE 2,159,630

PROCESS AND APPARATUS FOR MAKING SAFETY GLASS

Elmer H. Haux, Tarentum, and Earl L. Fix, New Kensington, Pa., assignors to Pittsburgh Plate Glass Company, a corporation of Pennsylvania Application March 17, 1936, Serial No. 69,298

9 Claims. (Cl. 49—81)

Figure 5:
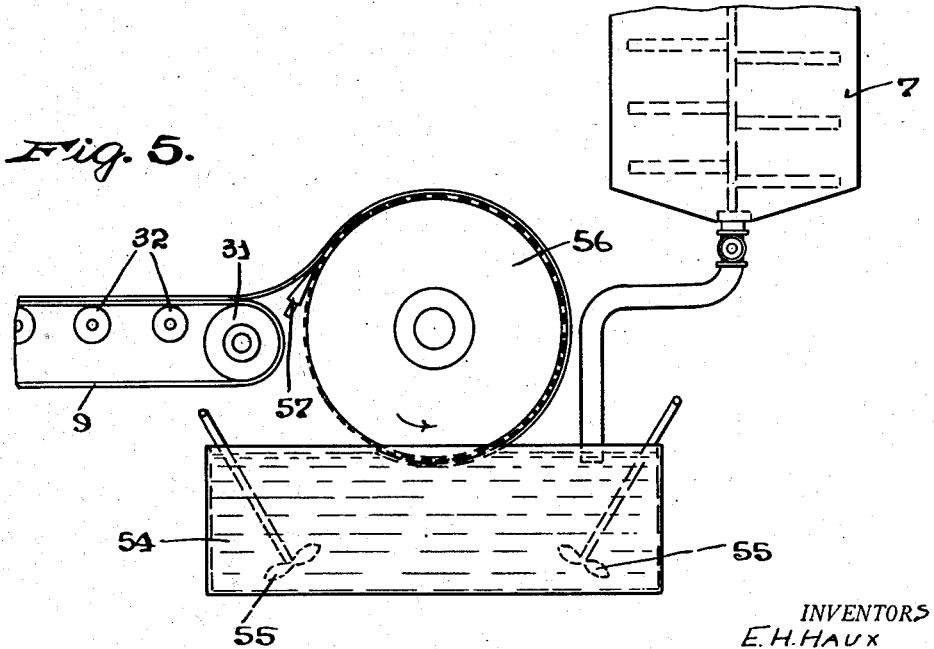

The invention relates to a process and apparatus for making safety glass in which an interlayer formed continuously in its initial stage, as set forth in the patent to E. H. Haux, No. 2,046,378, is utilized. In the Haux process, a mat layer is formed continuously from a mixture of synthetic resin, plasticizer, solvent and water, such layer being subject to a drying and curing process with the application of heat and pressure to produce a tough sheet, which is then cut into sections and laminated with pairs of sheets of glass in a manner similar to that commonly employed in making safety glass with cellulose nitrate or cellulose acetate as an interlayer. In the practice of our invention, as hereinafter set forth in detail, the mat layer, while still relatively soft and weak, is applied to the upper surfaces of a series of closely spaced glass sheets moving forwardly in a horizontal flight at the same rate of travel as the mat layer, with such layer extending out past the edges of the sheets and, as the line of sheets moves forward, the marginal portions of the mat layer which extend out past the edges of the sheets are caused to drop away, leaving each sheet of glass covered by a resin layer which is coextensive in area with that of the glass sheets. The next step is the curing of the resin layers on the glass sheets as they move forwardly, followed by the application to each assembly of a second glass sheet, thus completing the sandwiches. These are then carried through a roller press which is suitably heated, so that in the passage therethrough, the pairs of glass sheets are securely adhered to the resin interlayer. The sandwiches (which are thus preliminarily laminated) are then taken to an autoclave and laminated under heat and pressure in accordance with the Sherts and Hamill process of Patent No. 1,781,084. The objects of the invention are the cheapening of the laminating operation, as compared with that contemplated in said Haux application and in similar systems, in which the interlayer is formed into a completed continuous cured strip which must be cut into blank sizes suitable for use before laminating. With the present process and apparatus, no cutting or trimming of the interlayer is required, and the excess material around the edges of the sheets may be returned directly to the original mix from which the mat is generated, since the returned portions are soft and weak because of their solvent and water content, and are incorporated readily into the mix without preliminary maceration, such as is required with ordinary sheet scrap. The labor involved is also substantially reduced, as compared with that required in proceeding under the Haux application, since the cutting labor is eliminated, and the interlayer is applied to the glass by the apparatus, the only hand labor required being the application of the second glass sheets to the assemblies on the conveyor line preliminary to the pressing operation. Certain embodiments of the invention are illustrated in the accompanying drawings, wherein:

Figure 1 is a diagrammatic side elevation of the first part of the apparatus. Fig. 1a is a similar view of the second part of the apparatus. Fig. 2 is an enlarged section through a part of the apparatus. Fig. 3 is a diagrammatic plan view illustrating one step of the operation. Fig. 4 is a vertical section on the line IV—IV of Fig. 3, and Fig. 5 is a diagrammatic side elevation showing a modification.

Referring to the drawings, 1, 2 and 3 are containers respectively for water, solvent, and plasticizer; 4 is a mixer for the solvent and plasticizer; 5 is a container for the resin to be treated; 6 and 7 are additional mixers; 8 is a shallow feed tank or trough which receives the mixture from the tank 7; 9 is a screen conveyor or belt by means of which the layer of material from the trough 7 is carried along to form it into a mat or sheet; 10 is a second conveyor of the roller type adapted to carry a series of glass sheets beneath the conveyor 9 to permit the application of the mat or layer of resin thereto; 11 is a rack from which the glass sheets are supplied to the roller conveyor 10; 12 is a washer for the glass sheets through which they pass on the conveyor 10; 13 is a blower for supplying air to dry the glass sheets after they emerge from the washer; 14 is a heater through which the conveyor 10 passes for further drying the glass sheets preliminary to the application of the mat layer thereto; 15 is a trough collector for receiving the drainage of the water and solvent from the mat layer; 16 is a tank which receives the drainage, such mixture being returned to the mixer 7 by means of the pump 17, via the line 17a and box 18; 19 are presser rolls for compacting the resin layer upon the glass sheets as they move along the conveyor 10; 20 is a heated chamber, through which the conveyor 10 passes for removing any solvent and water left in the mat layer preliminary to pressing; 20a is a roller press through which the assemblies pass to insure adhesion between the glass sheets and the resin interlayer; and 21 is a rack upon which the completed sandwiches are placed as they emerge from the end of the roller press.

As the first step in the operation, quantities of solvent and plasticizer from the tanks 2 and 3 are supplied to the mixer 4 which carries agitating means driven from the motor 21a, the solvent preferably employed being methyl alcohol and the plasticizer being diethyl phthalate or dibutyl phthalate. This mixture, together with water from the tank 1, is then supplied to form the mixture in the tank 6, which has an agitator driven from the motor 22. The resin to be plasticized is supplied from the container 5 through the pipe 22a, such resin being preferably vinyl acetal in solid form divided so that it will pass through a 20 to 40 mesh screen. The resin is plasticized in the mixer 6 and forms a precipitate therein, due to the fact that the solvent will go into solution with the water, which is not a solvent of either the plasticizer or the resin. The agitator, however, prevents the plasticized resin from settling so that it is maintained in suspension in the mixture, and is supplied through the connection 23 to the mixer 7. This mixer is provided with an agitator driven from the motor 28a. Additional water is supplied to this mixer through the supply pipe 24 having the control valve 24a.

The mixture of water and solvent with the plasticized resin suspended therein is fed through the conduit 25 to the feed tank 8, a valve 25a serving to regulate the amount of flow. The tank 8 is pivoted at 26 at its forward end, and is supported at its rear end by a cable 26a extending around the drum 27 of the hoist 27a. This drum is operated by means of the hand chain 28, which drives the drum through the reduction gearing in the casing 29. By this means the tank may be tilted so as to regulate the flow of mixture or slurry to the endless screen conveyor 9. This screen conveyor passes around a pair of drums 30 and 31, one of which is suitably driven and over a plurality of intermediate rollers 32, which are preferably hollow and provided with suction means to assist in withdrawing liquid from the mat layer 33 (Fig. 2) passing thereover on the screen conveyor. A pair of spreading and leveling bars 34, 34 are preferably provided over the forward end of the conveyor in order to level off the mat layer. Water spray pipes 35 are also preferably employed over the conveyor, such pipes being fed from the supply pipe 36. This additional supply of water serves to wash out solvent from the mat layer, a suitable pan 36a being provided beneath the upper flight of the conveyor for collecting the liquid which drains from the mat layer. This liquid is conducted away through pipes 37, which lead to suitable means, not shown, for recovering the solvent. The drum 31 is of the perforated type, the same as the rolls 32, and is provided with suction means to assist in withdrawing water and solvent from the mat layer as it passes therearound. A presser roll 38 is provided in opposition to one of the rolls 32 in order to further smooth the mat layer at this point.

Spaced away from the forward side of the drum 31 is a guide shoe 40 which guides the mat layer around the drum and onto the series of glass sheets 41, which are carried beneath the bottom flight of the conveyor belt, as indicated most clearly in Fig. 2. The rolls of the conveyor 10 are driven at the same speed as the belt 9, and the glass sheets with the resin layer imposed thereon pass into a sheet metal box 42, which is open on its lower side and is provided with a plurality of transverse perforated pipes 43, to which air is applied under pressure. The application of the air under pressure to the mat layer assists in drying it out, and performs a further function of positively insuring that the portions of the mat layer which extend out past the edges of the glass sheets shall become detached from the main body of the layer and fall down into the trough or collector 15. This is illustrated diagrammatically in Figs. 3 and 4, which show the mat layer in its original condition in the right hand portions of the figures and with the excess of the layer removed in the left hand portion of the figures. The mat layer as it enters the box 42 is relatively weak and fragile due to its solvent and water content and will to a large extent drop away from the glass sheets at the supported edge portions merely by the action of gravity. The application of the air, however, assists in this action, so that when the glass sheets emerge from the box at the left hand end thereof, the mat layer on each glass sheet is coextensive therewith, so that any subsequent trimming away of the layer around the edges of the sheets is unnecessary. This involves a substantial saving in labor over an operation in which the resin layer must be trimmed by hand to the dimensions of the glass sheets.

The mixture of scrap from the edges of the mat layers, together with any accompanying drainage in the form of solvent and water, is conducted to the tank 16, and from this point is carried by the pump 17 to the box 18. This box 18 has an overflow pipe 44, by which excess liquid is conducted to the receiver 45 and thence by the pipe 46 to a suitable means for recovering the solvent. The remaining mixture of resin and liquid is conducted by a pipe 47 back to the mixer 7. The scrap material from the mat layer is thus recovered and returned directly to the system. Because of the relatively soft, loose texture of the scrap, it is unnecessary to macerate it preliminary to its return to the mixer, thus avoiding an item of expense which is present when hard scrap is recovered from a cured sheet of resin. A maximum economy is, therefore, present in the method incident to the removal of the edges of the mat layer, while the layer is soft and weak, such as is not present in a method in which the resin interlayer is cured preliminary to trimming it to sheet size. The receivers 15 and 16 are provided with overflow pipes 48 and 49 respectively for carrying away excess solvent and water.

The glass sheets 41 are applied to the conveyor 10 at the right hand end thereof, and after passing through the washer 17 are carried between the nozzles 50 and 51 operated from the blower 13, the nozzles 51 applying air pressure to the upper surfaces of the plate, while the nozzles 52 are of the suction type. A further drying of the sheets is accomplished by carrying them them through the heater 17, which may be of any suitable type. After the sheets with the resin interlayers thereon pass from the box 36, they are carried under the presser rolls 19 to insure their adherence to the glass and are then moved through the casing 20, which is provided with suitable heating means, such as the steam coils 53. This exposure to heat completes the removal of the solvent and water from the resin layer, thus preparing the assemblies for the application of the second glass sheets on the tops of the resin sheets. This application of the second sheets of glass to complete the sandwiches, is performed by hand just before the assemblies enter the roller press 20a. This roller press is an apparatus well known in the art, consisting of opposing pairs of rolls which apply pressure as the sandwiches pass therebetween, the casing being suitably heated to promote the adhesion of the resin to the glass. Sandwiches are thus delivered from the left hand end of the roller press, in which the sheets are securely adhered together. These sandwiches require a further pressing in order to produce a commercial article, and this is preferably accomplished by placing the sandwiches in an autoclave and subjecting them to heat and pressure as set forth in the Sherts and Hamill patent.

Fig. 5 illustrates a modification, in which the mixer 7 discharges to a tank 54, wherein the mixture is kept in agitation by means of the power driven agitators 55. A perforated suction drum 56 rotates in the liquid and picks up a layer thereof of the desired thickness, such thickness being regulated by the amount of suction applied to the drum. The drum is rotated in the direction indicated by the arrow and the mat layer thereon is peeled off by means of the scraper 57, so that the continuously formed sheet is delivered on the screen belt 9, which constitutes a part of a conveyor similar to that shown and described in connection with Fig. 1. From this point on, the operation parallels that set forth in connection with the other type of apparatus.

What we claim is:

1. A process of making laminated sheets consisting of pairs of glass sheets with interposed interlayers of synthetic resin, which consists in forming a mixture of synthetic resin, plasticizer, solvent and water, feeding a mat layer from the mixture in a continuous horizontal layer, conducting such layer onto a series of closely spaced glass sheets moving in the same direction as the layer on spaced supports with the edges of the layer extending out past the side edges of the glass sheets and with such layer bridging the spaces between the sheets, causing such layer edges and the bridging portions of the layer to separate from the layer and drop away therefrom and from the supports as the assemblies move forward, applying other glass sheets on the assemblies, and then carrying the assemblies through a roller press to cause the resin layer to adhere to the glass plates.

2. A process of making laminated sheets consisting of pairs of glass sheets with interposed interlayers of synthetic resin, which consists in forming a mixture of synthetic resin, plasticizer, solvent, and water, feeding a mat layer from the mixture in a continuous horizontal layer, conducting such layer onto a series of closely spaced glass sheets moving in the same direction as the layer on spaced supports with the edges of the layer extending out past the edges of the glass sheets, applying air under pressure to such layer edges to cause them to separate and drop away therefrom and from the supports as the assemblies move forward, applying other glass sheets on the assemblies, and then carrying the assemblies through a roller press to cause the resin layers to adhere to the glass plates.

3. A process of making laminated sheets consisting of pairs of glass sheets with interposed interlayers of synthetic resin, which consists in forming a mixture of synthetic resin, plasticizer, solvent and water, feeding a mat layer from the mixture in a continuous horizontal layer, removing a substantial portion of the solvent and water from the layer, applying rolling pressure to the layer, conducting such layer onto a series of closely spaced glass sheets moving in the same direction as the layer with the edges of the layer on spaced supports extending out past the edges of the glass sheets, causing such layer edges to separate from the layer and drop away therefrom and from the supports as the assemblies move forward, applying other glass sheets on the assemblies, and then carrying the assemblies through a roller press to cause the resin layers to adhere to the glass plates.

4. Apparatus for making laminated glass, which comprises means for forming continuously a mat layer consisting of synthetic resin, plasticizer, solvent, and water and including a horizontal conveyor, a second conveyor positioned to receive the mat layer from the first conveyor and adapted to carry a series of glass plates beneath the mat layer, so that such layer overlies the sheets and moves therewith at the same rate of travel, and means for directing fluid under pressure against the edges of the mat layer for separating from the mat layer those portions which extend out past the edges of the glass sheets while the assembly moves along the second conveyor.

5. Apparatus for making laminated glass, which comprises means for forming continuously a mat layer consisting of synthetic resin, plasticizer, solvent and water, and including an endless belt conveyor having upper and lower horizontal flights, roller presser means above the upper flight for compacting the layer thereon, a second conveyor beneath the first conveyor adapted to carry a series of glass sheets in parallel with and in the same direction as the lower flight of the upper conveyor, and guide means at the end of the first conveyor for causing the mat layer to follow such conveyor from its upper to its lower flight.

6. Apparatus for making laminated glass, which comprises means for forming continuously a mat layer consisting of synthetic resin, plasticizer, solvent and water, and including an endless belt conveyor having upper and lower horizontal flights, roller presser means above the upper flight for compacting the layer thereon, a roll around which the belt extends in transit from the upper to the lower flights, means for causing the mat layer to follow the belt around said roll to the lower flight thereof, and a second conveyor beneath the lower flight of the first conveyor in parallel therewith and driven in the same direction, said second conveyor being adapted to carry a series of glass sheets to which said layer is applied.

7. Apparatus for making laminated glass, which comprises means for forming continuously a mat layer consisting of synthetic resin, plasticizer, solvent and water, and including an endless belt conveyor having upper and lower horizontal flights, suction means over which the belt extends, a second conveyor positioned to receive the mat layer from the first conveyor comprising spaced supports and adapted to carry a series of glass plates beneath the mat layer so that such layer overlies the sheets and moves therewith at the same rate of travel, air pressure means for separating from the mat layer those portions which extend out past the edges of the glass sheets, a container beneath the second conveyor for receiving the edge portions of the mat layer, heating means for curing the resin past which the second conveyor travels, preliminary to the application of second sheets of glass to the assemblies to complete them, and a roller press through which the complete assemblies are carried by the second conveyor.

8. Apparatus for making laminated glass, which comprises means for forming continuously a mat layer consisting of synthetic resin, plasticizer, solvent and water, and including an endless belt conveyor having upper and lower horizontal flights, water spray means above the upper flight for removing excess solvent from the layer, roller presser means also above the first flight following the spray means for compacting the layer thereon, a second conveyor beneath the first conveyor adapted to carry a series of glass sheets in parallel with and in the same direction as the lower flight of the upper conveyor, and guide means at the end of the first conveyor for causing the mat layer to follow such conveyor from its upper to its lower flight.

9. Apparatus for making laminated glass which comprises means for forming continuously a mat layer consisting of synthetic resin, plasticizer, solvent and water, and including an endless belt conveyor having upper and lower horizontal flights, spreader means above the upper flight for leveling off the layer passing therebeneath, roller presser means also above the first flight back of the spreader means for compressing the layer thereon, a roll around which the belt extends in transit from the upper to the lower flights, means for causing the mat layer to follow the belt around said roll to the lower flight thereof, and a second conveyor beneath the lower flight of the first conveyor in parallel therewith and driven in the same direction, said second conveyor being adapted to carry a series of glass sheets to which said layer is applied.

ELMER H. HAUX.
EARL L. FIX.